(12) United States Patent
Yu et al.

(10) Patent No.: US 11,810,329 B2
(45) Date of Patent: Nov. 7, 2023

(54) METHOD, SYSTEM, AND DEVICE FOR COLOR MEASUREMENT OF A SURFACE

(71) Applicants: Yuanhao Yu, Markham (CA); Shuhao Li, Unionville (CA); Juwei Lu, North York (CA); Jin Tang, Markham (CA)

(72) Inventors: Yuanhao Yu, Markham (CA); Shuhao Li, Unionville (CA); Juwei Lu, North York (CA); Jin Tang, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 16/953,029

(22) Filed: Nov. 19, 2020

(65) Prior Publication Data
US 2022/0156979 A1    May 19, 2022

(51) Int. Cl.
*G06T 7/90* (2017.01)
*G06N 3/084* (2023.01)
*G06T 7/521* (2017.01)
*G06T 7/557* (2017.01)

(52) U.S. Cl.
CPC .............. *G06T 7/90* (2017.01); *G06N 3/084* (2013.01); *G06T 7/521* (2017.01); *G06T 7/557* (2017.01)

(58) Field of Classification Search
CPC ........... G06T 7/90; G06T 7/521; G06T 7/557; G06N 3/084
See application file for complete search history.

(56) References Cited

U.S. PATENT DOCUMENTS

| | | | |
|---|---|---|---|
| 2004/0228523 A1* | 11/2004 | Hibi | H04N 1/603 382/162 |
| 2006/0078225 A1 | 4/2006 | Pearson et al. | |
| 2009/0294671 A1* | 12/2009 | Baghai | G01J 5/0816 250/338.1 |
| 2022/0026276 A1* | 1/2022 | Harvill | G01J 3/0289 |

FOREIGN PATENT DOCUMENTS

| | | |
|---|---|---|
| CN | 101611307 | 12/2009 |
| CN | 106610314 | 5/2017 |
| CN | 109506780 | 3/2019 |
| CN | 110440921 | 11/2019 |
| KR | 100442320 B1 * | 7/2004 |

* cited by examiner

*Primary Examiner* — Chan S Park
*Assistant Examiner* — Daniel C Chang

(57) ABSTRACT

Methods and systems for determining a surface color of a target surface under an environment with an environmental light source. A plurality of images of the target surface are captured as the target surface is illuminated with a variable intensity, constant color light source and a constant intensity, constant color environmental light source, wherein the intensity of the light source on the target surface is varied by a known amount between the capturing of the images. A color feature tensor, independent of the environmental light source, is extracted from the image data, and used to infer a surface color of the target surface.

18 Claims, 5 Drawing Sheets

METHOD, SYSTEM, AND DEVICE FOR COLOR MEASUREMENT OF A SURFACE

TECHNICAL FIELD

The present disclosure relates to color measurement, in particular methods and systems for color measurement of a surface using a color measurement device.

BACKGROUND

Color measurement aims to provide a reliable estimation of the true color value of a given surface in a format defined by a particular color space. However, current methods of color measurement typically require specialized devices, such as a colorimeter, that are not readily access in daily life.

Despite advances in image acquisition technology and being readily accessible, susceptibility to environmental lighting conditions continue to hinder mobile phones from becoming a suitable option for color measurement. Specifically, color information obtained directly from digital images taken by mobile phones cannot provide reliable result as the color of the photos may be strongly influenced by the environmental lighting conditions. Currently color correction operations available on mobile phones, includes white balancing, a subjective process by human observers, do not offer any meaningful recourse. Therefore, the color of a target surface as shown in digital images taken by mobile phones may deviate significantly compared to the true color of the target surface depending on the environmental lighting conditions.

Attempts have been made to utilize mobile phone as a color measuring device. However, such attempts require additional equipment. Specifically, as controlling environmental lighting is key to current color measurement methods, mobile phone based color measuring methods often require covering at least a portion of the target surface with, for example, a non-transparent cup-shaped object to create an absolute dark cavity over the surface, and performing the color measurement therewithin. The absolute dark cavity eliminates environmental lighting such that lighting on the target surface may be controlled. However, the need to create such an absolute dark cavity over the target surface is inconvenient and costly as additional equipment may be needed. Further, irregularly shaped target surfaces can be difficult to cover such that an accurate color measurements may not be possible.

SUMMARY

The present disclosure provides a color measurement device that can be used as a colorimeter to accurately measure a color a surface. The color measurement device of the present disclosure, and the method performed by the color measurement device obviate the disadvantages of prior art methods for using mobile phones as colorimeters to measure a color of a surface.

In accordance with one aspect, the present disclosure provides a method of measuring a color of a target surface. The method includes capturing a plurality of images of the target surface as the target surface is illuminated with a variable intensity, constant color light source and a constant intensity, constant color environmental light source, wherein the intensity of the light source on the target surface is varied by a known amount between the capturing of the images. The method also includes determining, from image data included in the plurality of image, a color feature tensor that corresponds to a product of the color of the light source and a surface color of the target surface and inferring the surface color of the target surface based on the color feature tensor.

In accordance with the preceding aspect, the intensity of the light illuminating the target surface may be varied by changing a distance between the light source and the target surface.

In accordance with any of the preceding aspects, inferring the surface color of the target surface based on the color feature tensor may include inputting the color feature tensor into a trained model for processing the color feature tensor and inferring the surface color of the target surface based the processed color feature tensor.

In accordance with any of the preceding aspects, the trained model is a trained linear model. The linear model is trained by: initializing weights of a weight matrix; receiving a batch of training samples of a training dataset, each training sample of the training dataset including an image of a surface and a ground truth surface color tensor representative of a true color of the surface. For each respective sample of the batch of training samples, the image of respective training sample is processed to generate a color feature tensor that corresponds to a product of a training color of the light source and the ground truth surface color; a surface color tensor is computed as a product of the color feature tensor and the weight matrix, and an error value is determined as a difference between the surface color tensor and the ground truth surface color tensor; updating the weights of the weight matrix based on the error value. The linear model is further trained by receiving further batches of training samples until the weights of the weight matrix are optimized.

In accordance with any of the preceding aspects, the trained model is approximated by a neural network. The neural network may be trained by: initializing weights of the neural network, receiving a batch of training samples of a training dataset, where each training sample of the training dataset includes an image of a surface and a ground truth surface color of the surface. The neural network is further trained by, for each respective training sample, processing the image of training sample to generate a color feature tensor that corresponds to a product of light emitted by the light source and the ground truth surface color of the surface, forward propagating the color feature tensor generated for the respective training sample through the neural network to infer a surface color for the training sample, computing an error value for as a difference between the inferred surface color and the ground truth surface color, and performing backpropagation to update the weights of the neural network based on the error value.

In accordance with any of the preceding aspects, capturing may include detecting, using a time-of-flight sensor, a distance between the color measuring device and the target surface at a first time, and detecting, using the time-of-flight sensor, a distance between the color measuring device and the target surface at a second time. When the distance between the color measuring device and the target surface has changed, the light source is controlled to emit light of the constant color and a constant intensity to illuminate the target surface and capturing a digital frame of the target surface.

In accordance with any of the preceding aspects, the intensity of the light illuminating the target surface may be varied by changing an amount of electrical power supplied to the light source at a constant distance from the target surface.

In accordance with any of the preceding aspects, the inferring may further include converting the inferred surface color of the surface in a first color space to a surface color in a second color space.

In accordance with any of the preceding aspects, the trained model may be trained by dividing a color space into a plurality of color subspaces, initializing weights of a subspace separation model and weights of a color subspace model for each of the plurality of color subspaces, receiving a training sample comprising an image of a surface and a ground truth surface color of the surface. The trained model may also be trained by processing the image of the training sample to generate a color feature tensor that corresponds to a product of light emitted by the light source and the ground truth surface color, computing a subspace color tensor by each of the color subspace models using the received color feature tensor, generating a subspace weight tensor by the subspace separation model, and inferring an surface color by applying the subspace weight tensor to the subspace color tensors. The trained model may also be trained by determining an error value as a difference between the inferred surface color and the ground truth surface color, and performing backpropagation to update the weights of each of the plurality of color subspace models and weights of the subspace separation model.

In accordance with any of the preceding aspects, the color space may be divided in accordance with a manual definition.

In accordance with any of the preceding aspects, the plurality of color subspace models and subspace separation model are trained concurrently.

In accordance with any of the preceding aspects, the determining may include generating, from the image data included in the plurality of images, a plurality of linear equations based on image data in each of the image being the sum of the product of the color of the light source and the surface color of the target surface and the product of the environmental light source and the surface color of the target surface, and determining the color feature tensor from the plurality of linear equations using linear regression.

In another aspect, the present disclosure provides a color measurement device for measuring a target surface color of a target surface illuminated with a constant intensity, constant color environmental light. The color measurement device includes an image acquisition device configured to capture a plurality of images of the target surface, a light source configured to illuminate the target surface with a constant color light. The intensity of a light emitted from the light source is varied by a known amount between the capturing of successive images, and a color easement system. The color measurement system is configured to determine, from image data included in the plurality of images, a color feature tensor that corresponds to a product of the color of the light emitted by the constant light source and a surface color of the target surface, and infer the surface color of the target surface based on the color feature tensor.

In another aspect, the present disclosure provides a computer-readable medium having instructions tangibly stored thereon. The instructions, when executed by a processing unit, cause the processing unit to: capture a plurality of digital images of the target surface using a camera of the color measuring device as the target surface is illuminated with constant color light emitted by a controlled light source of the color measuring device that is in a fixed position relative to the camera and a constant intensity, constant color environmental light, wherein the intensity of the light illuminating the target surface is varied by a known amount between the capturing of the images; determining, from image data included in the plurality of images, a color feature tensor that corresponds to a product of the color of the light emitted by the constant light source and a surface color of the target surface; and inferring the surface color of the target surface based on the color feature tensor.

At least some of the above aspects may advantageously permit accurate color measurement that is robust against the impacts of environmental lighting conditions, thus allowing devices such as mobile phones to be used as a reliable color-measuring device.

BRIEF DESCRIPTION OF THE DRAWINGS

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

Figure 1:
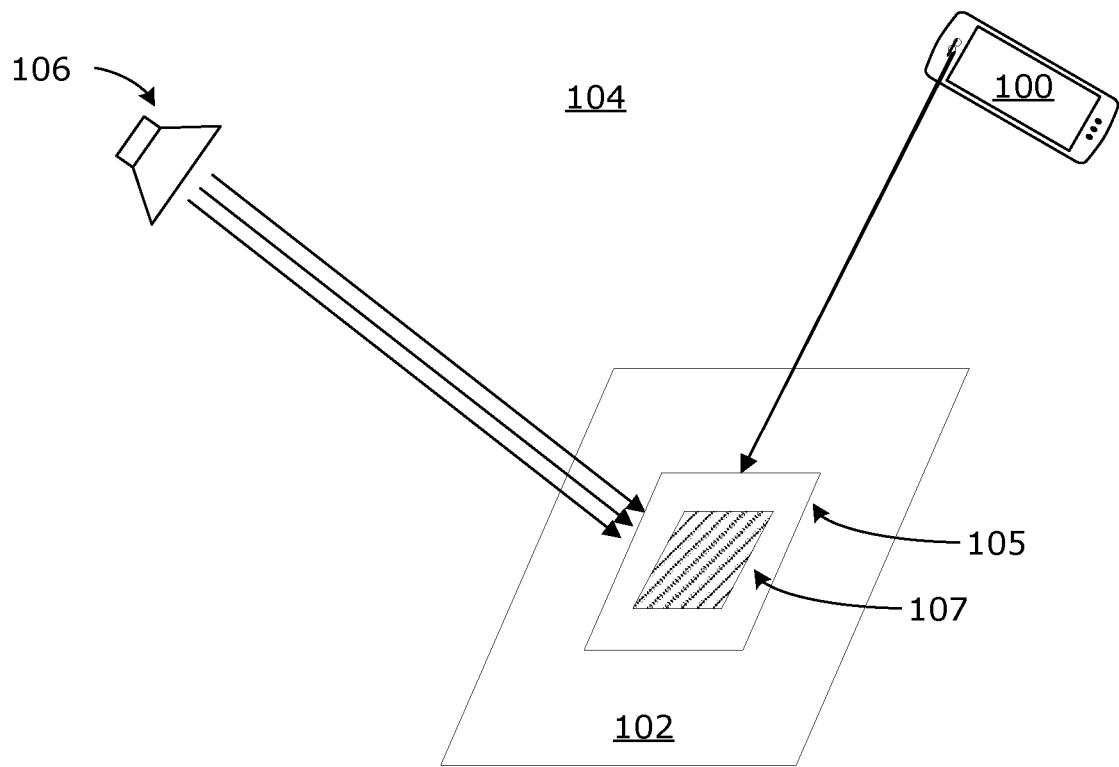
FIG. 1 is a schematic diagram illustrating a color measurement device in accordance with an example embodiment of the present disclosure employed to determine the color of a target surface within an environment.

FIG. 1 illustrates an example of a color measurement device 100 in accordance with the present disclosure employed to determine the color of a target surface 102 within an environment 104, which includes an environmental light source 106.

The target surface 102 may be a flat or irregularly shaped surface that reflects a certain bandwidth of the visible light spectrum dependent on a surface color, or true color, of the surface that is to be measured.

The environment 104 in which the target surface 102 is situated includes one or more light sources, collectively referred as the environmental light source 106, that contributes to the illumination of the target surface 102. By way of non-limiting examples, the environmental light source 106 may include any combinations of natural sunlight and artificial lighting such as fluorescent, luminescent, and gas discharges sources. The environmental light source 106 is of constant intensity and constant color such that the illumination on the target surface 102 by the environmental light source 106 remains essentially constant during the color determination process as discussed in more detail below.

The color measurement device 100 is configured to infer (i.e. predict), the surface color of the target surface 102 by processing images 105 (otherwise known as frames), which includes a patch of pixel values 107, captured by a camera of the target surface 102. The color measurement device 100 may be a smartphone as shown in FIG. 1 or any other computing device that includes a camera, or may be connected to and communicate with an external camera, including for example a personal laptop computer or a desktop computer, or other mobile computing device such as for example a tablet, a Personal Digital Assistant (PD), a Digital Single Lens Reflex (DSLR) camera.

Figure 2:
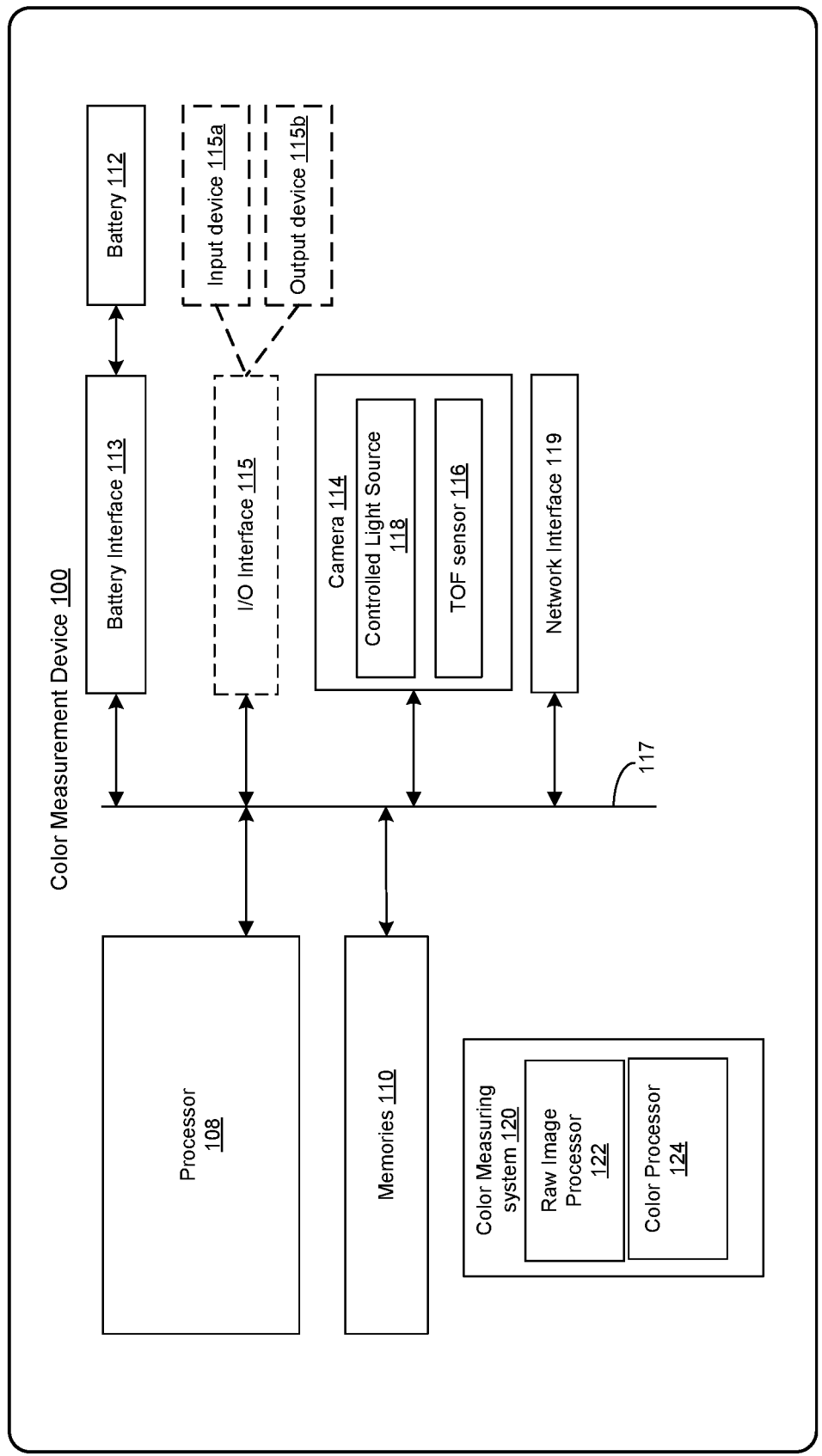
FIG. 2. illustrates a simplified block diagram of the color measurement device in FIG. 1.

Referring to FIG. 2, a simplified block diagram of the color measurement device 100 is shown. Although an example embodiment of the color measurement device 100 is shown and discussed below, other embodiments may be used to implement examples disclosed herein, which may include components different from those shown. Although FIG. 2 shows a single instance of each component of the color measurement device 100, there may be multiple instances of each component shown.

The color measurement device 100 includes one or more processor(s), collectively referred to as processor 108, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The processor 108 controls the overall operation of the color measurement device 106. The processor 108 is coupled to a plurality of components via a communication bus (not shown) which provides a communication path between the components and the processor 108. The processor 108 is operative to control the various component devices, such as one or more non-transitory memory 110, battery 112, image acquisition device in the form of a camera 114, time-of-flight (ToF) sensor 116, among other components. The processor 108 is further operative to execute subroutines in the color measurement device 100 used to manipulate data. For example, the processor 108 may be used to manipulate image date from images 105 taken by the camera 114. These manipulations may include comparison, cropping, compression, color and brightness adjustment, and the like.

There may be a bus 117 providing communication among components of the color measurement device 100, including the processor 108, battery interface 113, camera 114, option I/O interface(s) 115, network interface(s) 119, and memory(ies) 110. The bus 117 may be any suitable bus architecture including, for example, a memory bus, a peripheral bus or a video bus.

The color measurement device 100 may include one or more optional network interface(s) 109 for wired or wireless communication with a network (e.g., an intranet, the Internet, a P2P network, a WAN and/or a LAN) or other node. The network interfaces 109 may include wired links (e.g., Ethernet cable) and/or wireless links (e.g., one or more antennas) for intra-network and/or inter-network communications.

The color measurement device 100 may also include one or more optional input/output (I/O) interfaces 115, which may enable interfacing with one or more optional input devices 115a and/or optional output devices 115b. In the example shown, the input device(s) 115a (e.g., a lighting equipment, a mouse, a microphone, a touchscreen, and/or a keypad) and output device(s) 208 (e.g., a display, a speaker and/or a printer) are shown as optional and internal to the color measurement device. In other examples, one or more of the input device(s) 115a and/or the output device(s) 115b may be external to the color measurement device 100. In other examples, there may not be any input device(s) 115a and output device(s) 115b, in which case the I/O interface(s) 115 may not be needed.

The one or more non-transitory memories 110 may include a volatile or non-volatile memory (e.g., a flash memory, a random access memory (RAM), and/or a read-only memory (ROM)). The non-transitory memory 110 may store instructions for execution by the processor 108, such as to carry out examples described in the present disclosure. The memory 110 may include other software instructions, such as for implementing an operating system and other applications/functions.

In an embodiment, memory 110 stores machine readable software instructions that are executable by the processor 108 for implementing a color measuring system 120 to process images captured from the camera 114 to isolate a patch of pixel values, determine a color tensor C of the patch, and to infer (i.e. predict) the surface color of the target surface 102 based on the color tensor C as described in further detail below. The color measuring system 120 may include an image processing module 122, and a color processing module 124. As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, an application specific integrated circuit (ASIC), field programmable gate array (FPGA), or a system on a chip (SoC) or another hardware processing circuit. In some alternative embodiments, the color measuring system 120, including color processing module 122 and color processing module 124, may be implemented as a single hardware device, such as that is designed to process images captured from the camera 114 to isolate a patch of pixel values, determine a color tensor C of the patch, and to infer (i.e. predict) the surface color of the target surface 102 based on the color tensor C as described in further detail below. The single hardware device includes electronic circuits that perform the functions of the image processing module 122 and color processing module 124. In other example embodiments, the system 120 may be implemented as multiple hardware devices (e.g., multiple ASIC, FPGAs, and/or SoCs). Each hardware device includes electronic circuits that perform the functions of one of the image processing module 122 and color processing module 124, the details of which will be discussed further below. It should be understood that the image processing module 122 and color processing module 124 are not necessarily separate units of the system 120, and that the illustration of the image processing module 122 and color processing module 124 as separate blocks within the system 120 may only be a conceptual representation of the overall operation of the system 120.

In some embodiments, the image processing module 122 is configured to process images 105 captured by the camera 114, which may include cropping a patch of image pixels 107 from captured images 105 and determining a color tensor C of the patch 107. The color processing module 124 is configured to predict or infer, using a trained model, the target surface color using the color tensor C from the image processing module 122.

In some embodiments, the color processing module 124 may be a machine-learning based software module that implements a trained model which predicts the surface color of a target surface from captured image data as described in further detail below. In the present disclosure, the surface color of a target surface refers to the color of the light that would be reflected off of the target surface under a white light source. In other words, the surface color refers to the true color of the surface independent of any color bias from the environmental light sources.

In some examples, the color measurement device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the color measurement device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the color measurement device 100 may communicate with each other via a bus, for example.

The battery 112 functions as a power source, and may be a rechargeable or non-rechargeable battery. The battery 112 provides electrical power to at least some of the components of the color measurement device 100. A battery interface 113 provides a mechanical and electrical connection for the battery 112. The battery interface 113 may be coupled to a regulator (not shown) which provides power V+ to the circuitry of the color measurement device 100. In some embodiments, the battery 112 is a large-capacity, non-rechargeable, sealed battery which is expected to have a relatively long service life, such as 5-7 years of active service. In some embodiments, the color measurement device 100 may also include a power interface (not shown), such as a power port, for connecting to an external power source (not shown) such as an alternating current (AC) power adapter. The color measurement device 100 may utilize the external power source rather than the battery 112. If the battery 112 is rechargeable, the external power source may be used to recharge the battery 112.

The color measurement device 100 may be capable of detecting certain aspects of the environment 104. In some embodiments, the color measure device 100 includes one or more time of flight (ToF) sensors 116 for distance measurement from device 100 to a surface directly in front of the ToF sensor 116 by measuring the travel time of an infrared light signals emitted by the ToF sensor 116 to be deflected back from an object surface. The color measurement device 100 may also include other types of sensors including light sensor, temperature sensor, pressure sensor, humidity sensor, gyroscope, accelerometer, and door contact switch (not shown).

The digital camera 114 may be capable of capturing light reflected from an object in the form of digital images (generally referred to as frames), each frame including a plurality of pixel values indicative of color values. In some embodiments, where the camera 114 is internal to the color measurement device, the digital camera 114 may be operably coupled to the processor 108 through bus 117 through which frames may be transferred. In some other embodiments, the camera 114 may be external to the color measurement device 100. In such embodiments, camera 114 may be operably coupled to the processor 108 through I/O interface 115 where frames captured by the digital 114 are received by the I/O interface 115 and provided to the processor 108 to be processed through bus 117. The digital camera 114 may employ Charge Coupled Device (CCD) or Metal Oxide Semiconductor (MOS) based photosensors combined with a Bayer color filter array (CFA) to capture color image data. Generally speaking, cameras integrated into small consumer products, such as mobile devices or handheld device, generally use CMOS photosensors, which are usually cheaper and have lower power consumption in battery powered devices than CCDs where cost may be of concern. On the other hand, CCD photosensors are typically used for high end broadcast quality video cameras. The photosensors are capable of detecting the number of light photons arriving at each sensor and generates a corresponding electrical charge indicative of the number of light photons arriving at each sensor. The information captured by each photosensor is defined as a pixel in the output. In some further embodiments, the camera 114 is external to the color measurement device 100 and the images 105 captured by camera 114 may be coupled to the processor 108 through a network Typically, a Bayer CFA is placed in front of the photosensors to provide color sensitivity since the photosensors are by design sensitive to light and not color. Specifically, a Bayer CFA employs what is referred to as the "Bayer Pattern," a checkerboard-like arrangement of red, green, and blue color filters on a square grid of photosensors that allows digital cameras to capture color information. A Bayer CFA typically has one color filter element in front of each photosensor. Each filter element acts as a band-pass filter to incoming light and passes a different band of the visible light spectrum. Generally, half of the color filters are green, and the rest are evenly divided between red and blue to mimic human eyesight's greater resolving power with respect to green light. Each Bayer pattern comprises of a 2×2 color filter block that is repeated for the entire CFA. The color filter block may vary. Examples of the color filter block may include blue-green-green-red (BGGR), RGBG, GRGB, or RGGB. The output of Bayer-filtered camera is a Bayer pattern image containing RGB signals, and in the absence of any processing done on the signals, the Bayer pattern image is said to be in RAW format.

Since each photosensor is filtered to record a luminosity value of only one of three colors, the pixel value from each photosensor cannot fully specify each of the red, green, and blue values on its own. To obtain a full-color image, various debayer, or often referred to as demosaicing, algorithms can be applied by a raw converter (not shown) to interpolate a set of complete red, green, and blue values for each pixel. These algorithms make use of the surrounding pixels of the corresponding colors to estimate the values for a particular pixel. Many demosaicing algorithms may be possible, including nearest-neighbor interpolation demosaicing copies an adjacent pixel of the same color channel. Another example of demosaicing algorithm may be bilinear interpolation, whereby the red value of a non-red value is computed as the average of the two or four adjacent red values, and similarly for blue and green. Other demosaicing algorithms include Variable Number of Gradients (VNG), Pixel Grouping (PPG), Adaptive Homogeneity-Directed (AHD), and Aliasing Minimization and Zipper Elimination (AMaZE), to name a few. As the color information is expressed in terms of the red, green, and blue primary colors, the sensor data is said to be in RGB color space, where a color space defines a mathematical link between distributions of wavelengths in the electromagnetic visible spectrum, and physiologically perceived colors in human color vision.

The image acquisition device further includes a constant color light source 118 (hereinafter referred to as light source 118). For cameras 114, the light source 118 may be a flash device. Light source 118 may be built directly into the camera 114 as shown in FIG. 2. However it is to be understood that some cameras allow separately light sources to be mounted via a standardized "accessory mount" bracket (not shown). In other settings, flash devices may be large, standalone units, or studio strobes, connected to, the color measurement device 100. While the color of the light source 118 is constant, the intensity of the light source 118 may be varied by the processor 108 as discussed in more detail below.

Figure 3:
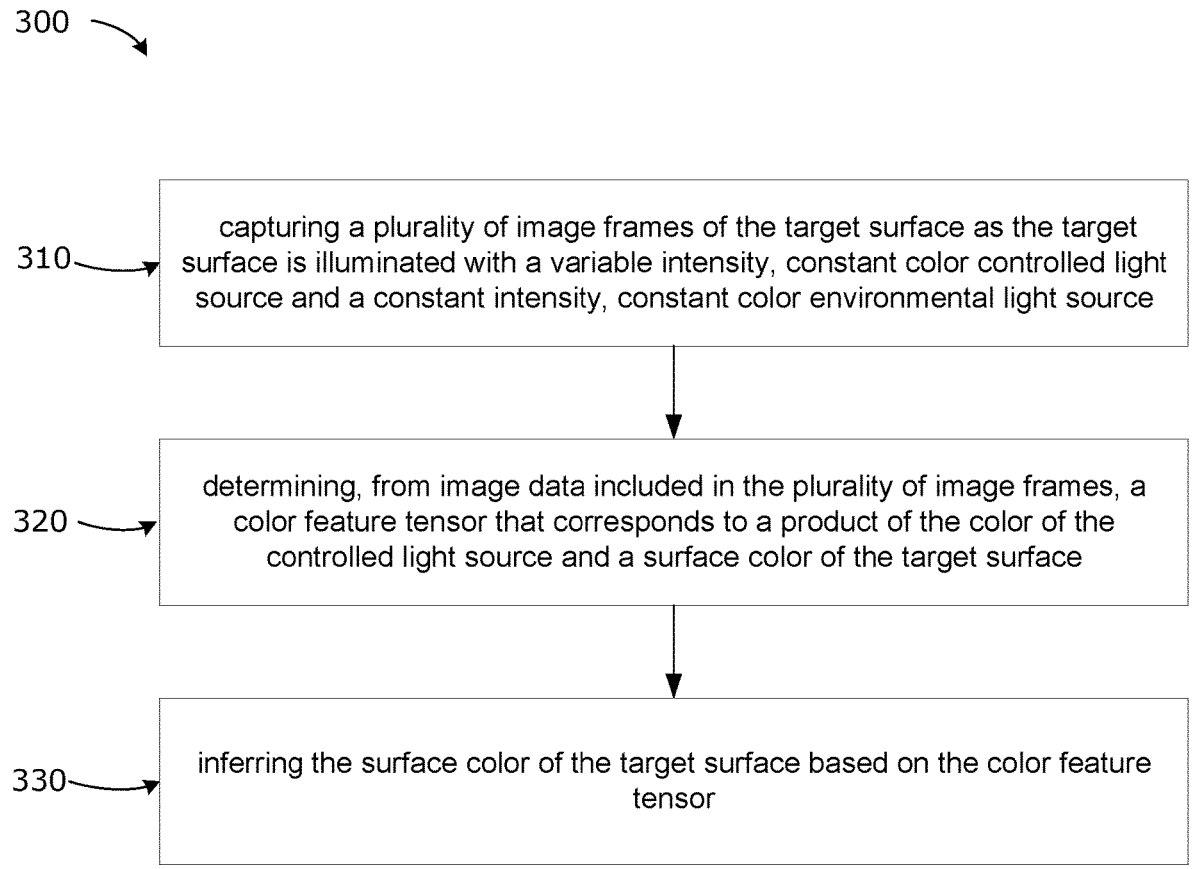
FIG. 3 illustrates a flowchart of a method of color measurement performed by the color measurement system 120 of FIG. 2 in accordance to an example embodiment of the present disclosure.

FIG. 3 is a flowchart of a method 300 performed by the color measurement system 120 of the present disclosure for performing color measurement of a target surface using a color measuring device according to an example embodiment of the present disclosure. The method 300 may be implemented in software that is executed by the processor 108. The method 300 may include additional or fewer actions than shown and described, and may be performed in a different order. Computer-readable code or instructions of the software that implements the method 300, when executed by the processor 108 of the color measurement device 100, may be stored in the memory 110 or a computer-readable medium.

At step 310, the color-measuring device 100 is configured to capture a plurality of images 105 of a target surface 102 using the camera 114 as the target surface 102 is illuminated by light emitted by the light source 118 and by environmental light, wherein each frame includes a patch of pixel values 107. In some embodiments, the captured digital images of the target surface 102 are outputs of the camera 114 in the Red-Green-Blue (RGB) color space, where each color pixel value comprises a red, a green, and a blue component.

During the capture of each of the plurality of images (i.e. frames by camera 114, the color measurement device 100 is configured to illuminate the target surface 102 with light emitted by the light source 118. The light emitted by the light source 118 may have a constant color and a constant intensity. In between capturing each successive images 105, the intensity of the light illuminating the target surface 102 is varied by a known amount. The intensity of light illuminating the target surface 102 may be varied, and the variation in light intensity may be represented by an intensity factor α. In some embodiments, the intensity of light illuminating the target surface 102 may be varied by changing the amount of electrical power supplied to a light source 118, or by varying a distance between the light source 118 and the target surface 102.

In some embodiments, the environment 104 may be limited in size such that movement of the color measurement device 100 is restricted. For example, the target surface 102 may be located in a confined space where movement of the color measuring device 100 as discussed in more detail below is restricted thus prohibiting variation of the light intensity. In such embodiments, the intensity of light emitted from the light source 118 may be varied by changing the electrical power supply to the light source 118. For example, the light source 118 may be a light source capable of emitting light of varying intensity and constant color, such as Light-emitting Diodes (LEDs) (not shown), where adjusting the electrical power supplied to the light source 118, by known means, changes the intensity of light emitted by the light source 118. The amount of light emitted by the light source 118 is determined by a supply voltage or current supplied to the light source 118, which may be varied by a known amount by the processor 108 through battery interface 113. As it may be appreciated, light intensity variation through varying electrical voltage or current by processor 108 may be more precise than that of varying distance of color measurement device 100 from the target surface by manual means. Hence, light intensity variation through varying electrical power to the light source 118 may provide a more precise intensity variation of light emitted by the light source 118, which may allow for more accurate color prediction.

Based on the particular characteristics of the light source 118, image processing module 122 may determine the amount of variation in the intensity of light emitted by the light source 118 that corresponds to the change in electrical power supply. The camera 114 is configured to capture a plurality of images 105 of the target surface 102 where the intensity of light emitted by the light source 118 is varied between the capturing of each successive images 105. Each captured images 105 may be associated with the electrical power value at which it was captured in data storage. In such embodiments, the distance and angle between the color measurement device 100 and the target surface 102 is maintained approximately the same while the intensity of the light emitted by the light source 118 is varied. In some embodiments, the user may be instructed, via a Graphical User Interface (GUI) display to keep the color measurement device 100 still during digital image (i.e. frame) capture by the camera 114. In some other embodiments, the color measurement device 100 may be kept stationary with respect to the target surface 102 using a stand or mounting equipment.

In some further embodiments, the intensity of the light emitted from the light source 118 may also be varied by changing the distance between the color measurement device 100 and the target surface 102. The color measurement device 100, starting at an initial distance from the target surface 102, may be continuously moved closer to, or further away from, the target surface 102 at a relatively constant angle. The color measurement device 100 may be manually moved by a user of the color measurement device 100. In some embodiments, the color measurement device 100 may instruct the user, through a graphical user interface (GUI), to continually move the distance measurement device 100 closer to, or further from, the target surface 102 while maintaining a constant angle between the color measurement device 100 and the target surface 102. It is to be understood that the color measurement device 100 may also be moved by automated means, such as by a mechanized mount. Other methods, such as by vocal commands, of varying color measurement device 100 may also be used. The change in distance between the color measurement device 100 and the target surface 102 may be determined using ToF sensor 116 by detecting a travel time of an infrared signal emitted from the color measurement device 100 and reflected back from the target surface 100. Other suitable methods of distance measurement methods, including using binocular distance measurement method if the color measurement device 100 has two or more cameras on the side, may also be implemented.

While the color measurement device 100 is being moved with respect to the target surface 102, the light source 118 is configured to emit light at a constant color and a constant intensity to illuminate the target surface 102 at various distances. The light source 118 may be configured to emit light illuminating the target surface 102 between fixed time intervals or at distinct distances from the target surface 102. Each time the target surface 102 is illuminated by lights emitted from the light source 118, the camera 114 may be configured to capture one or more images 105 of the target surface 102.

At step 320, the image processing module 122 is configured to determine a color feature tensor from images 105 and its corresponding intensity variation factor α, by eliminating the component of the light reflected off of target surface 102 that was emitted from the environmental light source 106 from a color tensor extracted from image 105. The color feature tensor may be expressed as a product of the light reflected off of the target source that was emitted from the light source 118 of the color measurement device 100 and the surface color of the target surface 102.

In some embodiments, the images 105 are received by the image processing module 122, which is configured to determine a color tensor C, which is representative of the pixel values in each image 105 indicative of light reflected off of target surface 102 from all light sources (106 and 118). For example, the color tensor C may be an average pixel value of all the pixel values in image 105. Other suitable methods of determining a color tensor C, such as a weighted average of pixel values in each image 105, a modal value, a median value, or a histogram of the RGB values of the image 105, among others, may be used.

In some further embodiments, rather than processing all pixels of an image 105, the color tensor C may be derived from a patch of pixel values in an image 105, which may provide more expedient processing with less computing resource usage. For example, the image processing module 122 may isolate or crop a patch of pixel values 107 that are representative of the target surface color from a captured image 105, and determine a color tensor C as described above based on the pixel values contained within the patch 107. In some embodiments, the patch 107 may be a center patch of an image 105. It is to be understood that the patch 107 may be obtained from any portions of the image 105 such that the pixel values of patch 107 substantially and uniformly represent the color of the target surface 102. The patch 107 may user selected, or alternatively, the patch may be a fixedly portion (such as the center patch) of an image 105. In some embodiments, the size of each patch 107 is 120×120 pixels. It is to be understood that the camera 114 may capture images 105 in any suitable resolutions, and as such, the size of patch 107 may be adjusted accordingly. Additionally, the patch size may also be adjusted for factors including processing time, available computing resources, and size of target surface 102. The image processing module 122 may then determine a color tensor C representative of the pixel values in patch 107. The color tensor C, in some embodiments, may be determined in a color space that is consistent with the color space in which the images 105 are captured.

The color tensor C may be expressed as a product of the light from all light sources under which the target surface 102 is illuminated and a surface color of the target surface 102 as expressed mathematically in the following Equation (1):

$$C = L \times R \quad \text{Equation (1)}$$

where L is the light reflected off of target surface 102, and R is the surface color of the target surface 102.

During the capturing of image 105, the target surface 102 is illuminated under lights emitted from both the light source 118 of the color measurement device 100 as well as the environmental light source 106. Hence, the light reflected off of target surface 102, L from Equation (1) above, has two contributing components, namely, light emitted from the light source 118 or $L_{control}$, and light from environmental light source 106 or $L_{env}$. Accordingly, Equation (1) may be expanded into Equation (2) as follows:

$$C = L \times R$$

$$C = (L_{control} + L_{env}) \times R$$

$$C = L_{control} \times R + L_{env} \times R \quad \text{Equation (2)}$$

From Equation (2), it can be seen that since the environmental light 106 is of constant intensity and constant color, the term $L_{env} \times R$ remains constant in all frames 105 captured by the camera 114. Hence, any variation in the intensity of the light emitted by the light source 118 (as denoted by α) may be proportionally reflected in the color tensor C. In the non-limiting example where the intensity of the light emitted by the light source 118 decays quadratically as a function of the distance over which light emitted by the light source 118 travels, the light intensity variation α may be expressed as $$\frac{1}{d^2},$$

where d is the distance between the light source 118 and the target surface 102. For example, the image processing module 122 may obtained value of d from ToF sensor 116, and apply a light intensity variation $$\alpha = \frac{1}{d^2}$$

to the intensity of light emitted from light source 118. For embodiments where the intensity is varied by changing electrical power (P) to the light source 118, the light intensity variation α may be a function of the electrical power value f(P), where the function f(·) may be unique to each light source 118 depending on the physical characteristics of the light source 118.

Accordingly, Equation (2) may be expanded into Equation (3) as follows:

$$C = \alpha L_{control\_source} \times R + L_{env} \times R \quad \text{Equation (3)}$$

where the light reflected off of target surface 102 $L_{control}$ is further expressed as the product of the intensity of light as emitted from light source 118, $L_{control\_source}$, and the light intensity variation α. It is to be understood that as the light emitted by the light source 118 may vary between different models or manufacturers of the light source 118, and $L_{control\_source}$ may be unique to each models and/or makes of the light source 118.

Based on Equation (3), the plurality of images 105 each captured with different light intensity variation α results in a plurality of linear Equations (4) as follows:

$$\begin{cases} C_1 = \alpha_1 L_{control\_source} \times R + L_{env} \times R \\ C_2 = \alpha_2 L_{control\_source} \times R + L_{env} \times R \\ C_3 = \alpha_3 L_{control\_source} \times R + L_{env} \times R \\ \vdots \end{cases} \quad \text{Equations (4)}$$

Color tensor C and light intensity variation α from linear Equations (4) are known values as described above, and the component of light emitted from the environmental light 106 $L_{env} \times R$ is identical for all linear Equations (4). Hence, each of Equations (4) is in the linear equation format of y=ax+b, where y is color tensor C, x is the light intensity variation α, a is the color feature tensor $L_{control_{source}} \times R$, and b is the component of light reflected off of target surface as result of environmental light 106 $L_{env} \times R$. The color feature tensor $L_{control_{source}} \times R$ is representative of the light reflected off the of the target surface 102 having a surface color of R as the result of illumination by light emitted from the light source 118. The color feature tensor $L_{control_{source}} \times R$ as well as $L_{env} \times R$ may be determined by using any suitable mathematical modelling technique. In some embodiments, linear regression is used to determine the color feature tensor $L_{control_{source}} \times R$ and $L_{env} \times R$ using the Equations (5) below:

$$\begin{cases} L_{env} \times R = \dfrac{\left(\sum_{i=1}^{n} \alpha_i\right)\left(\sum_{i=1}^{n} C_i^2\right) - \left(\sum_{i=1}^{n} \alpha_i\right)\left(\sum_{i=1}^{n} \alpha_i C_i\right)}{n\left(\sum_{i=1}^{n} \alpha_i^2\right) - \left(\sum_{i=1}^{n} \alpha_i\right)^2} \\ L_{control_{source}} \times R = \dfrac{n\left(\sum_{i=1}^{n} \alpha_i C_i\right) - \left(\sum_{i=1}^{n} \alpha_i\right)\left(\sum_{i=1}^{n} C_i\right)}{n\left(\sum_{i=1}^{n} \alpha_i^2\right) - \left(\sum_{i=1}^{n} \alpha_i\right)^2} \end{cases} \quad \text{Equations (5)}$$

At step 330, the color processing module 124 receives the color feature tensor $L_{control_{source}} \times R$ as determined by the image processing module 122 described above, and predicts the value of the target surface color R using a trained model.

In some embodiments, the present disclosure utilizes a trained linear model to predict the color R of the target surface 102. The trained linear model may be specific to a particular make or model of the light source 118. The linear model may be trained using any suitable machine learning algorithm to learn the parameters (e.g. weights and biases) of the model.

Figure 4:
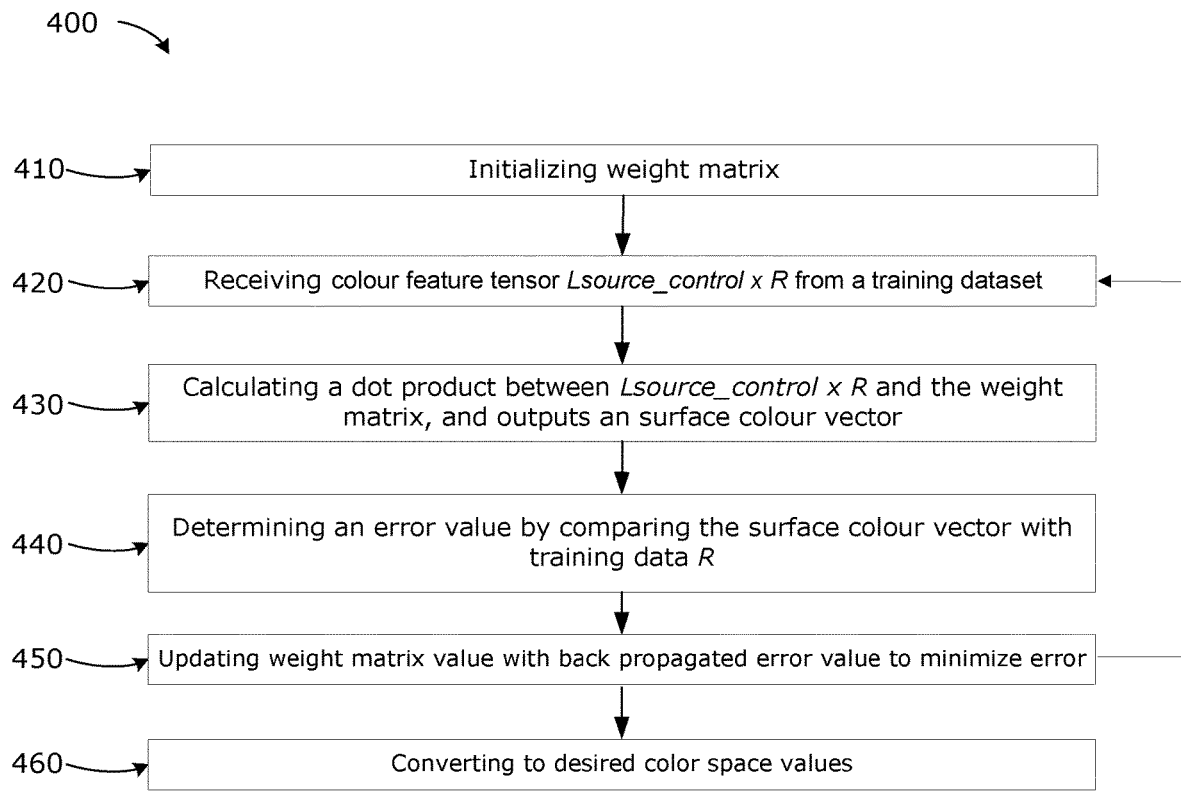
FIG. 4 illustrates a flowchart of a method for inferring the target surface color using a trained linear model.

FIG. 4 illustrates a flowchart of a method 400 for training a linear model for predicting the target surface color R in accordance with one embodiment of the present disclosure. The method 400 may utilizes a supervised learning algorithm to learn the weights of the linear model during training. As may be appreciated from the details below, the linearity of the model derives from the absence of a non-linear activation function.

At step 410, the weights of the linear model may each be initialized with initial values, which may be randomized values, zeroes, or any other suitable initial values.

At step 420, the linear model receives a sample from a training dataset, where each sample includes a data pair including a training color feature tensor that is the product of the color of light emitted by the light source 118 and the target surface color (i.e. $L_{control\_source} \times R$), and a corresponding label identifying the target surface color value R. The training color feature tensor may be determined from one target surface under various environmental lighting conditions, or multiple target surfaces under the same environmental lighting condition, or multiple target surfaces under multiple lighting conditions.

At step 430, the model computes the dot product of a weight matrix of the linear model and the training color feature tensor to obtain a predicted target surface color.

At step 440, predicted target surface color is compared to the R value identified by the label corresponding to the training color feature tensor from the same training sample to determine an error value through the application of a loss function. The loss function may vary depending on an objective for the linear model. By way of non-limiting example, if the objective of the linear model is to predict the target surface color as visually close to the target surface color R as possible, the loss function may compute a Euclidean distance between the predicted target surface color and the target surface color R from the training dataset in CIELab color space. The CIELab color space is defined by the International Commission on Illumination (CIE) to express colors using three values: L* for the lightness from black (0) to white (100), a* from green (−) to red (+), and b* from blue (−) to yellow (+). The CIELab color space is designed so that the same amount of numerical change in CIELab color space values corresponds to roughly the same amount of visually perceived change. The predicted target surface color in, for example, RGB color space of the camera 114 may be converted to CIELab color space value through known linear transformations such as by transforming the RGB values to values in the XYZ color space, and then convert the XYZ values to CIELab color space values. For vectors a and b of dimension size n, the Euclidean distance between these vectors may be determined as follows:

$$\sqrt{(a_1 - b_1)^2 + ((a_2 - b_2)^2 + (a_3 - b_3)^2 + \cdots + (a_n - b_n)^2}$$

Where $(\alpha_1, \alpha_2, \alpha_3 \ldots \alpha_n)$ are the CIELab color space values of the target surface color R from the training dataset and $(b_1, b_2, b_3 \ldots b_n)$ are the CIELab color space values of the target surface color as predicted by the linear model, and Euclidean distance between $\alpha_1, \alpha_2, \alpha_3 \ldots \alpha_n$ and $(b_1, b_2, b_3 \ldots b_n)$ is indicative of a difference in color value.

Alternatively, if the objective of the linear model is to predict the target surface color to be as close to the color space value of the target surface color R from the training dataset as possible, the loss function may be an average absolute difference between the predicted target surface color and the target surface color R from the training dataset. For example, the average absolute difference between vectors a and b of dimension size n may be calculated as follows:

$$\frac{1}{n}\sum_{i=1}^{n} |a_i - b_i|$$

At step 450, the error value (i.e. the loss) computed in step 440 may be back propagated to update the value of the weights in the weight matrix using gradient descent to minimize the loss. The steps 420 to 450 may be iteratively repeated until the error value (i.e. the loss) is below a threshold value such that the predicted target surface color is deemed sufficiently close to the target surface value R and the weights of the linear model are optimized.

Once the linear model is trained (i.e. the weights and biases of the linear model are learned), the trained linear model may be deployed onto a color measurement device 100 in any form, including as a stand-alone program or as a module, component, subroutine, or other unit stored in memory 110 and is suitable to be executed by processor 108. The trained model may be deployed to a computing system (in other words stored in memory of the computing) for execution by processor(s) 108 of computing system. For example, the computing system may include one or more physical machines, such as server(s), or one or more virtual machines provided by a private or public cloud computing platform. The computing system may be a distributed computing system comprising multiple computers distributed across multiple sites and interconnected by a communication network and the trained linear model may be deployed and running on the computers located at the multiple sites.

It may be desirable to convert the predicted target surface color in a first color space, such as the RGB color space in which the images 105 were captured, to a second color space that may be better suited for another purpose. For example, the sRGB color space may be better suited for display on an electronic display unit, and the CIELab color space may provide a targets surface color representation that is independent of display device. Thus, optionally, at step 460, the predicted target surface color R from step 450 may be converted to a second color space through transformation functions that are well known in the art.

Figure 5:
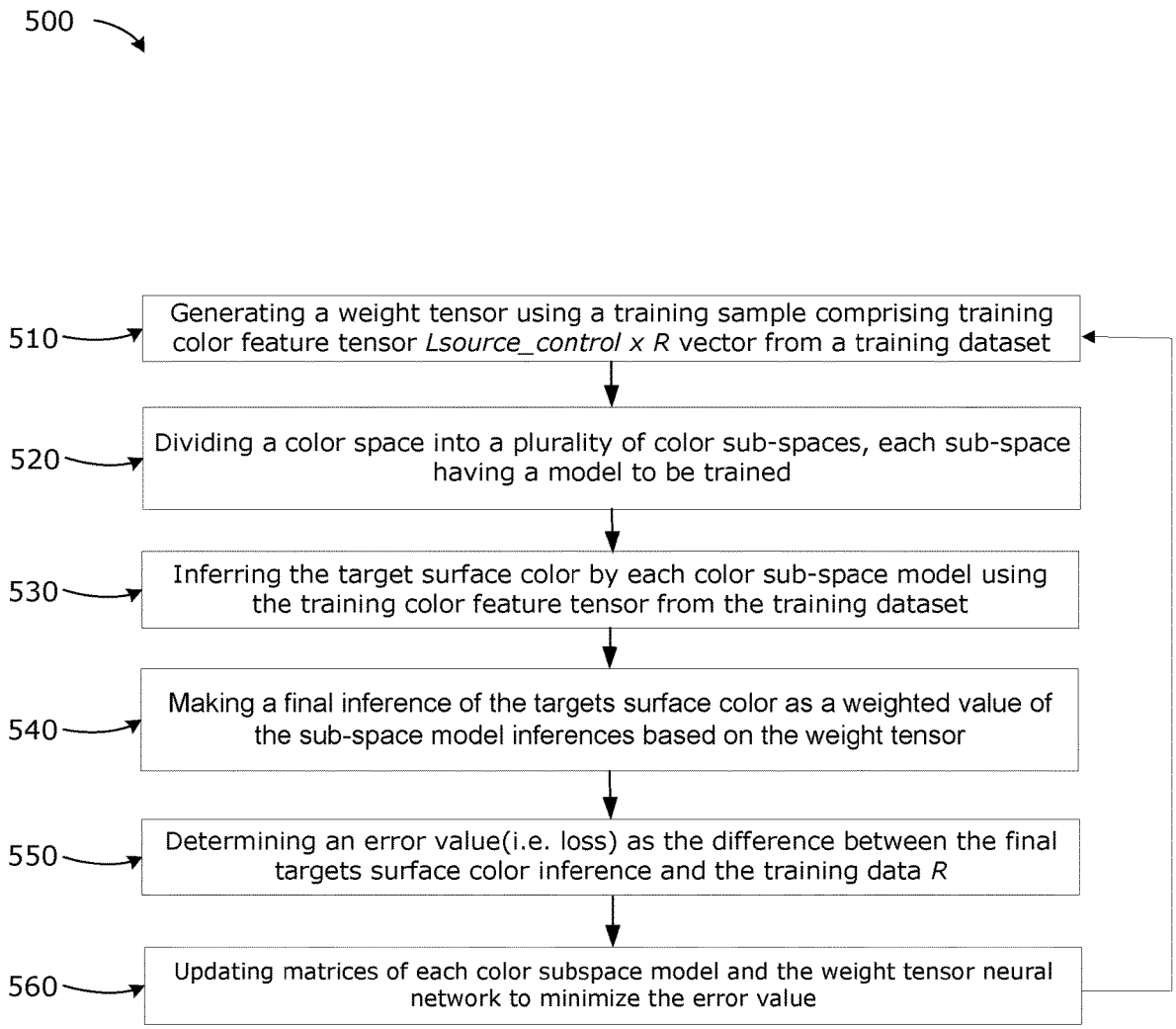
FIG. 5 illustrates a flowchart of a method for inferring the value of a target surface using a plurality of color sub-spaces models.

In some further embodiments, the color processing module 124 uses a trained neural network for predicting the target surface color. FIG. 5 illustrates a flowchart of a method 500 for training a neural network that approximates a model. The neural network is configured to predict target surface color R in accordance with the present disclosure. In method 500, the color processing module 124 may include a neural network trained using training dataset comprising color feature tensors $L_{control\_source} \times R$ that is representative of the light reflected off of the target surface 102 that was emitted from light source 118. By way of a non-limiting example, the neural network may be a multi-layer perceptron (MLP) network that may include an input layer, one or more hidden layers, and an output layer. The neural network can be trained, for example, to satisfy an accuracy requirement for inferences of the target surface color R. One or more of the hidden layers of the neural network may permit the method 500 to be capable of transforming the inferred target surface color R to any desired color space without further transformation or conversion steps.

In training the neural network, it is provided with an input of an frame, or alternatively a training color feature tensor that is the product of the color of light emitted by the light source 118 and the target surface color (i.e. $L_{control\_source} \times R$) from a training dataset, along with a corresponding label identifying the target surface color value R. A non-linear activation function may be applied to an intermediary predicted target surface color to derive a predicted target surface color in a desired color space. Accordingly, the need for a further color space transformation is obviated. In some embodiments, the activation function is implemented using rectified linear units (ReLUs), however other activation functions may be used as appropriate.

FIG. 5 shows the flowchart of a method 500 for predicting the target surface color R in accordance with another exemplary embodiment of the present disclosure that may be implemented at step 320. Specifically, method 500 involves dividing a color space in which the target surface color R is to be expressed into a plurality of color sub-spaces, and a model, whether linear or neural network, is trained for each color sub-space weight values optimized for said color sub-space resulting in a plurality of models to be deployed for predicting the target surface color R.

Specifically, at 510, a training sample from training dataset is received as input to a neural network configured to generate a weight tensor containing a sub-space weight value that corresponds to each color sub-space, where the weight values indicate the weight assigned to the output of each color sub-space in determining the final target surface color prediction. The training sample includes a training data pair including a training color feature tensor that is the product of the color of light emitted by the light source 118 and the target surface color (i.e. $L_{control\_source} \times R$), and a corresponding label identifying the target surface color value R. The training color feature tensor is indicative of the light reflected off of a target surface as the result of illumination by light emitted from light source 118.

At 520, a color space is divided into a plurality of color sub-spaces. In some embodiments, the color space may be divided into a plurality of color sub-spaces in accordance with manually defined boundaries. In some other embodiments, the color sub-space division boundaries may be learned through machine learning algorithms.

At 530, the training color feature tensor $L_{control_{source}} \times R$ of a training sample is received by each sub-space model as an input, where each color subspace model infers a target surface color R;

At 540, the a final target surface color inference is made as a weighted value of the target surface color inferences by each sub-space model based on the weight tensor;

At 550, the final inferred target surface color is compared to the R value identified in the label of the training sample to determine an error value (i.e. a loss). The computed error value (i.e. the loss) is back propagated using gradient ascent to adjust the values of the weights of each the color sub-space model matrix, as well as the weights in the neural network that generated the weight tensor, to minimize the loss. The steps 510 to 550 may be iteratively repeated until the error value (i.e. the loss) is below a threshold value such that the final target surface color inference is deemed a sufficient approximation of the target surface color R.

In some embodiments, the color sub-space models and the weight tensor neural network may be trained concurrently or sequentially.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of measuring a color of a target surface using a color measuring device, comprising:
    capturing a plurality of digital images of the target surface using a camera of the color measuring device as the target surface is illuminated with constant color light emitted by a controlled light source of the color measuring device that is in a fixed position relative to the camera and a constant intensity, constant color environmental light, wherein the intensity of the light illuminating the target surface is varied by a known amount between the capturing of the images;
    generating, image data included in the plurality of images, a plurality of linear equations based on the image data from each image in the plurality of images, the image data comprising a sum of a product of the color of the controlled light source and a surface color of the target surface and a product of the environmental light source and the surface color of the target surface;
    determining a color feature tensor that corresponds to the product of the color of the light emitted by the controlled light source and the surface color of the target surface from the plurality of linear equations using linear regression; and
    inferring the surface color of the target surface based on the color feature tensor.

2. The method of claim 1, further comprising varying the intensity of the light illuminating the target surface by changing a distance between the controlled light source and the target surface.

3. The method of claim 1, wherein inferring the surface color of the target surface based on the color feature tensor comprises inputting the color feature tensor into a trained model for processing the color feature tensor and inferring the surface color of the target surface based the processed color feature tensor.

4. The method of claim 3, wherein the trained model is a trained linear model, and the linear model is trained by:
    initializing weights of a weight matrix;
    receiving a batch of training samples of a training dataset, each training sample of the training dataset including an image of a surface and a ground truth surface color tensor representative of a true color of the surface;
    for each respective sample of the batch of training samples:
        processing the image of respective training sample to generate a color feature tensor that corresponds to a product of a training color of the controlled light source and the ground truth surface color;
        computing a surface color tensor as a product of the color feature tensor and the weight matrix;
        determining an error value as a difference between the surface color tensor and the ground truth surface color tensor;
    updating the weights of the weight matrix based on the error value; and
    receiving further batches of training samples until the weights of the weight matrix are optimized.

5. The method of claim 3, wherein the trained model is approximated by a neural network, and the neural network is trained by:
    initializing weights of the neural network;
    receiving a batch of training samples of a training dataset, each training sample of the training dataset including an image of a surface and a ground truth surface color of the surface;
    for each respective training sample:
        processing the image of training sample to generate a color feature tensor that corresponds to a product of light emitted by the controlled light source and the ground truth surface color of the surface;
        forward propagating the color feature tensor generated for the respective training sample through the neural network to infer a surface color for the training sample;
        computing an error value for as a difference between the inferred surface color and the ground truth surface color; and
        performing backpropagation to update the weights of the neural network based on the error value.

6. The method of claim 1, wherein capturing comprises:
    detecting, using a time-of-flight sensor, a distance between the color measuring device and the target surface at a first time;
    detecting, using the time-of-flight sensor, a distance between the color measuring device and the target surface at a second time; and
    when the distance between the color measuring device and the target surface has changed, controlling the controlled light source to emit light of the constant color and a constant intensity to illuminate the target surface and capturing a digital frame of the target surface.

7. The method of claim 1, wherein the intensity of the light illuminating the target surface is varied by changing an amount of electrical power supplied to the controlled light source at a constant distance from the target surface.

8. The method of claim 1, wherein the inferring further comprises converting the inferred surface color of the surface in a first color space to a surface color in a second color space.

9. The method of claim 3, wherein the trained model is trained by:
    dividing a color space into a plurality of color subspaces;
    initializing weights of a subspace separation model and weights of a color subspace model for each of the plurality of color subspaces;
    receiving a training sample comprising an image of a surface and a ground truth surface color of the surface;
    processing the image of the training sample to generate a color feature tensor that corresponds to a product of light emitted by the controlled light source and the ground truth surface color;
    computing a subspace color tensor by each of the color subspace models using the received color feature tensor;
    generating a subspace weight tensor by the subspace separation model;

inferring an surface color by applying the subspace weight tensor to the subspace color tensors;
determining an error value as a difference between the inferred surface color and the ground truth surface color; and
performing backpropagation to update the weights of each of the plurality of color subspace models and weights of the subspace separation model.

10. The method claim 9, wherein the color space is divided in accordance with a manual definition.

11. The method of claim 9, wherein the plurality of color subspace models and subspace separation model are trained concurrently.

12. A color measurement device for measuring a target surface color of a target surface illuminated with a constant intensity, constant color environmental light, the device comprising:
an image acquisition device configured to capture a plurality of images of the target surface;
a light source configured to illuminate the target surface with a constant color light wherein the intensity of a light emitted from the light source is varied by a known amount between the capturing of successive images;
a color measurement system configured to:
generate, from image data from the plurality of images, a plurality of linear equations based on the image data from each image in the plurality of images, the image data comprising a sum of a product of the color of the controlled light source and a surface color of the target surface and a product of the environmental light source and the surface color of the target surface;
determine a color feature tensor that corresponds to the product of the color of the light emitted by the controlled light source and the surface color of the target surface from the plurality of linear equations using linear regression; and
infer the surface color of the target surface based on the color feature tensor.

13. The color measurement device of claim 12, wherein the intensity of the light illuminating the target surface is varied by changing a distance between the light source and the target surface.

14. The color measurement device of claim 12, wherein image acquisition device configured to capture a plurality of images of the target surface by :
detecting, using a time-of-flight sensor, a distance between the color measuring device and the target surface at a first time;
detecting, using the time-of-flight sensor, a distance between the color measuring device and the target surface at a second time; and
when the distance between the color measuring device and the target surface has changed, controlling the light source to emit light of the constant color and a constant intensity to illuminate the target surface and capturing a digital frame of the target surface.

15. The color measurement device of claim 12, wherein the surface color of the target surface based on the color feature tensor is inferred by inputting the color feature tensor into a trained model for processing the color feature tensor and inferring the surface color of the target surface based the processed color feature tensor.

16. The color measurement device of claim 12, wherein the intensity of the light illuminating the target surface is varied by changing an amount of electrical power supplied to the light source at a constant distance from the target surface.

17. The color measurement device of claim 12, wherein the color measurement system is further configured to convert the inferred surface color of the surface in a first color space to a surface color in a second color space.

18. A non-transitory computer-readable medium having instructions tangibly stored thereon, wherein the instructions, when executed by a processing unit, causes the processing unit to:
capturing a plurality of digital images of a target surface using a camera of the color measuring device as the target surface is illuminated with constant color light emitted by a controlled light source of the color measuring device that is in a fixed position relative to the camera and a constant intensity, constant color environmental light, wherein the intensity of the light illuminating the target surface is varied by a known amount between the capturing of the images;
generating, from image data from the plurality of images, a plurality of linear equations based on the image data from each image in the plurality of images, the image data comprising a sum of a product of the color of the controlled light source and a surface color of the target surface and a product of the environmental light source and the surface color of the target surface;
determining a color feature tensor that corresponds to the product of the color of the light emitted by the controlled light source and the surface color of the target surface from the plurality of linear equations using linear regression; and
inferring the surface color of the target surface based on the color feature tensor.

* * * * *